US012798327B2

(12) United States Patent
Washio

(10) Patent No.: US 12,798,327 B2
(45) Date of Patent: Nov. 17, 2026

(54) VEHICLE

(71) Applicant: TOYOTA JIDOSHA KABUSHIKI KAISHA, Toyota (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 18/675,345

(22) Filed: May 28, 2024

(65) Prior Publication Data

US 2025/0121652 A1 Apr. 17, 2025

(30) Foreign Application Priority Data

Oct. 13, 2023 (JP) ................................ 2023-177557

(51) Int. Cl.
*B60H 1/00* (2006.01)

(52) U.S. Cl.
CPC ..... *B60H 1/00778* (2013.01); *B60H 1/00421* (2013.01)

(58) Field of Classification Search
CPC ............ B60H 1/00657; B60H 1/00778; B60H 1/00735; B60H 1/00314; B60H 1/00964; B60H 2001/223485; B60L 58/26
See application file for complete search history.

(56) References Cited

U.S. PATENT DOCUMENTS

2015/0099443 A1* 4/2015 Hirabayashi ....... B60H 1/00778 454/75
2018/0244130 A1* 8/2018 Lee .................... B60H 1/00778
2022/0274460 A1* 9/2022 Hadano .............. B60H 1/00778

FOREIGN PATENT DOCUMENTS

JP 2022-132778 9/2022
WO WO-2022194314 A1 * 9/2022 ......... B60H 1/00428

* cited by examiner

*Primary Examiner* — Jianying C Atkisson
*Assistant Examiner* — Meraj A Shaikh
(74) *Attorney, Agent, or Firm* — SoraIP, Inc.

(57) ABSTRACT

When a vehicle receives a remote air conditioning request from user equipment with a system of the vehicle stopped, the vehicle turns on a remote air conditioning request signal after starting the system, and executes remote air conditioning in which the air conditioner is operated with the engine in operation, on the condition that a recognized shift that is a recognized shift position is a parking position. When the recognized shift is not the parking position, the prohibition of the remote air conditioning is suspended when the elapsed time from the system start is less than the predetermined time, and the prohibition of the remote air conditioning is determined when the elapsed time is equal to or more than the predetermined time.

4 Claims, 5 Drawing Sheets

VEHICLE

CROSS-REFERENCE TO RELATED APPLICATION

This application claims priority to Japanese Patent Application No. 2023-177557 filed on Oct. 13, 2023, incorporated herein by reference in its entirety.

BACKGROUND

1. Technical Field

The present disclosure relates to vehicles.

2. Description of Related Art

In conventional vehicles, a control device starts an air conditioning mode (remote air conditioning) in response to a request received from user equipment. The air conditioning mode is a mode in which air conditioning is operated with the vehicle prohibited from traveling. A vehicle has been proposed in which the air conditioning mode is ended when a first period has elapsed, and the first period is extended when a predetermined condition is satisfied (see, for example, Japanese Unexamined Patent Application Publication No. 2022-132778 (JP 2022-132778 A)). In the air conditioning mode, a vehicle system or an engine may be in operation, but the vehicle is not allowed to travel.

SUMMARY

In such a vehicle, when a request for remote air conditioning is received from user equipment with the system of the vehicle stopped, a remote air conditioning request signal is turned on after the system is started. The remote air conditioning is executed on the condition that the remote air conditioning request signal is on and a recognized shift that is a recognized shift position is a parking position. There are cases where shift-by-wire is used and the shift position is detected (determined) using well-known wall contact control etc. without mounting an absolute angle sensor for detecting the shift position. In such cases, a certain amount of time is required to detect the shift position, and the recognized shift is a non-parking position that is an initial value. Therefore, there is a possibility that prohibition of the remote air conditioning may be determined.

A primary object of a vehicle according to the present disclosure is to improve convenience of remote air conditioning.

The vehicle according to the present disclosure adopts the following means in order to achieve the above primary object.

A vehicle according to one aspect of the present disclosure includes: an engine;

- a generator configured to generate electricity using power from the engine;
- an air conditioner configured to perform air conditioning in a vehicle cabin;
- an energy storage device connected, together with the generator and the air conditioner, to a power line; and
- a control device configured to, when a remote air conditioning request is received from user equipment with a system of the vehicle stopped, turn on a remote air conditioning request signal after starting the system, and execute remote air conditioning on a condition that a recognized shift that is a recognized shift position is a parking position, the remote air conditioning being air conditioning in which the air conditioner is operated with the engine in operation.

The control device is configured to, when the recognized shift is not the parking position, suspend prohibition of the remote air conditioning when an elapsed time since starting of the system is less than a predetermined time, and determine prohibition of the remote air conditioning when the elapsed time is equal to or more than the predetermined time.

In the vehicle according to the aspect of the present disclosure, when a remote air conditioning request is received from the user equipment with the system of the vehicle stopped, the remote air conditioning request signal is turned on after the system is started. The remote air conditioning in which the air conditioner is operated with the engine in operation is executed on the condition that the remote air conditioning request signal is on and the recognized shift that is the recognized shift position is the parking position. When the recognized shift is not the parking position, prohibition of the remote air conditioning is suspended when the elapsed time since starting of the system is less than the predetermined time, and prohibition of the remote air conditioning is determined when the elapsed time is equal to or more than the predetermined time. Accordingly, the remote air conditioning can be facilitated compared to the case where prohibition of the remote air conditioning is immediately determined when it takes time to detect that the recognized shift is the parking position after the system is started. As a result, convenience of the remote air conditioning can be improved.

In the vehicle according to the aspect of the present disclosure, the control device may be configured to, when the system is started, start predetermined control for detecting the shift position (setting the recognized shift) and set the recognized shift to a non-parking position that is an initial value. The control device may be configured to, when the predetermined control is completed, set the recognized shift to a detected shift position In the vehicle according to the aspect of the present disclosure,

- the predetermined time may be set to a time longer than a time required for the predetermined control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
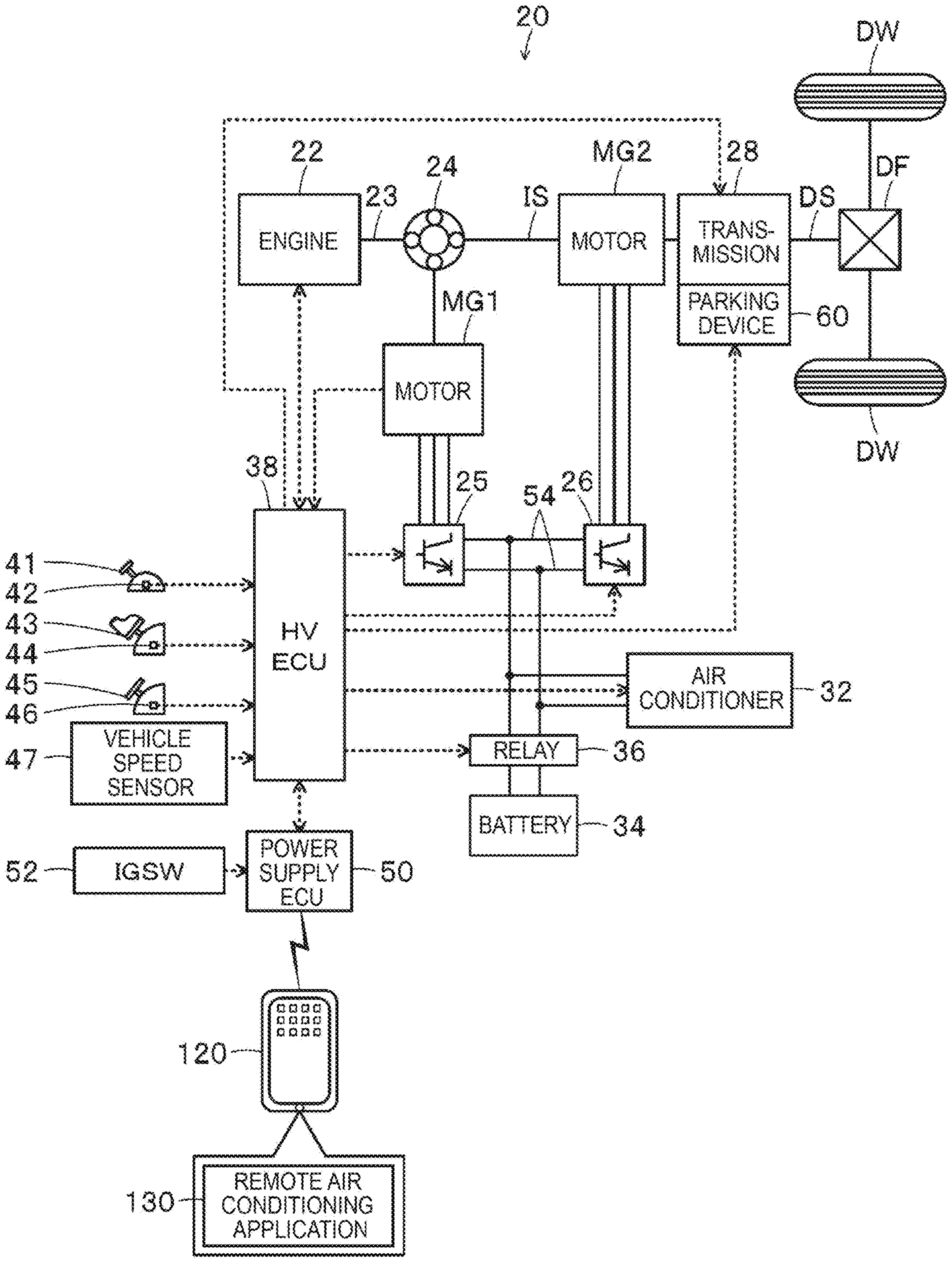
FIG. 1 is a schematic configuration diagram of a remote air conditioning system 10 including a hybrid electric vehicle 20 according to an embodiment of the present disclosure.

Embodiments of the present disclosure will be described with reference to the drawings. FIG. 1 is a schematic configuration diagram of a remote air conditioning system 10 including a hybrid electric vehicle 20 according to an embodiment of the present disclosure. As illustrated, the remote air conditioning system 10 of the embodiment includes a hybrid electric vehicle 20 and user equipment 120.

Hybrid electric vehicle 20 includes an engine 22, a planetary gear 24, a motor MG 1, MG 2, inverters 25 and 26, a transmission 28, a parking lock device 60, an air conditioner 32, a battery 34, a system main relay 36, a hybrid electronic control unit (hereinafter referred to as "HVECU") 38, and a power supply electronic control unit (hereinafter referred to as "power supply ECU") 50. In hybrid electric vehicle 20, a shift-by-wire that electrically switches the shift positions is adopted.

The engine 22 is configured as an internal combustion engine that outputs power using fuel such as gasoline and gas oil. The crankshaft 23 of the engine 22 is connected to the carrier of the planetary gear 24. The operation of the engine 22 is controlled by a HVECU 38.

The planetary gear 24 is configured as a single pinion type planetary gear mechanism. A rotor of the motor MG 1 is connected to the sun gear of the planetary gear 24. An inputting member of the transmission 28 is connected to a ring gear of the planetary gear 24 via an intermediate shaft IS. Here, the rotor of the motor MG 2 is also connected to the intermediate shaft IS. As described above, the crankshaft 23 of the engine 22 is connected to the carrier of the planetary gear 24.

Each of the motor MG 1, MG 2 is configured as a synchronous generator motor. As described above, the rotor of the motor MG 1 is connected to the sun gear of the planetary gear 24. The rotor of the motor MG 2 is connected to the intermediate shaft IS as described above. The inverters 25 and 26 each include a plurality of switching elements. The inverters 25 and 26 are connected to the power line 54 together with the air conditioner 32 and the battery 34. When the voltage (DC voltage) of the power line 54 is applied to the inverters 25 and 26, the plurality of switching elements of the inverters 25 and 26 are switched and controlled by HVECU 38, whereby a rotating magnetic field is formed in the three-phase coil of the motor MG 1, MG 2, and the motor MG 1, MG 2 is rotationally driven.

The transmission 28 includes an input member, an output member, a plurality of planetary gear mechanisms, and a hydraulically driven frictional engagement element (clutch or brake). The input member is connected to the intermediate shaft IS, and the output member is connected to a drive shaft DS connected to the drive wheel DW via a differential gear DF. The transmission 28 is controlled by a HVECU 38 to change the gear position.

Figure 2:
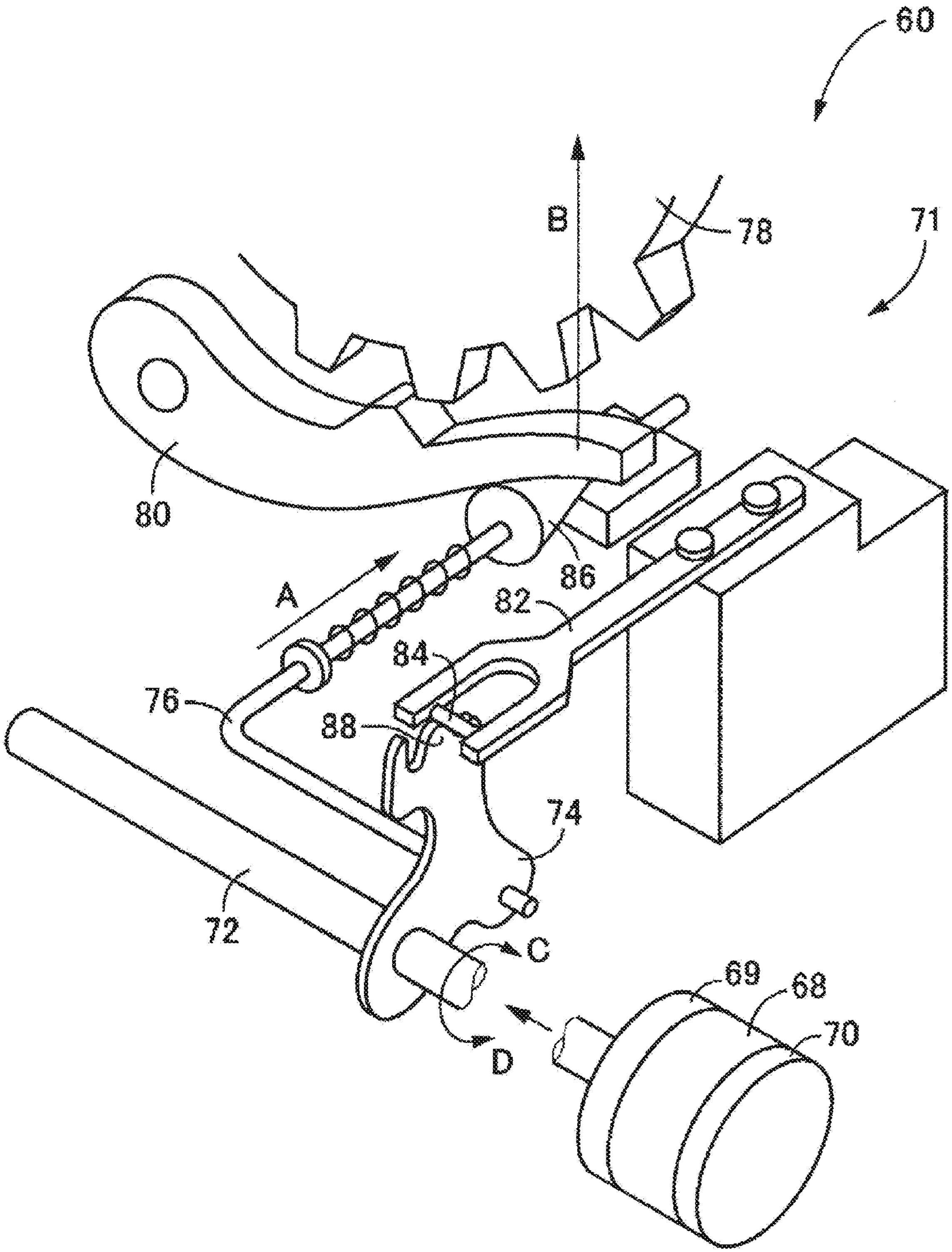
FIG. 2 is a schematic configuration diagram of the parking lock device 60.
Figure 3:
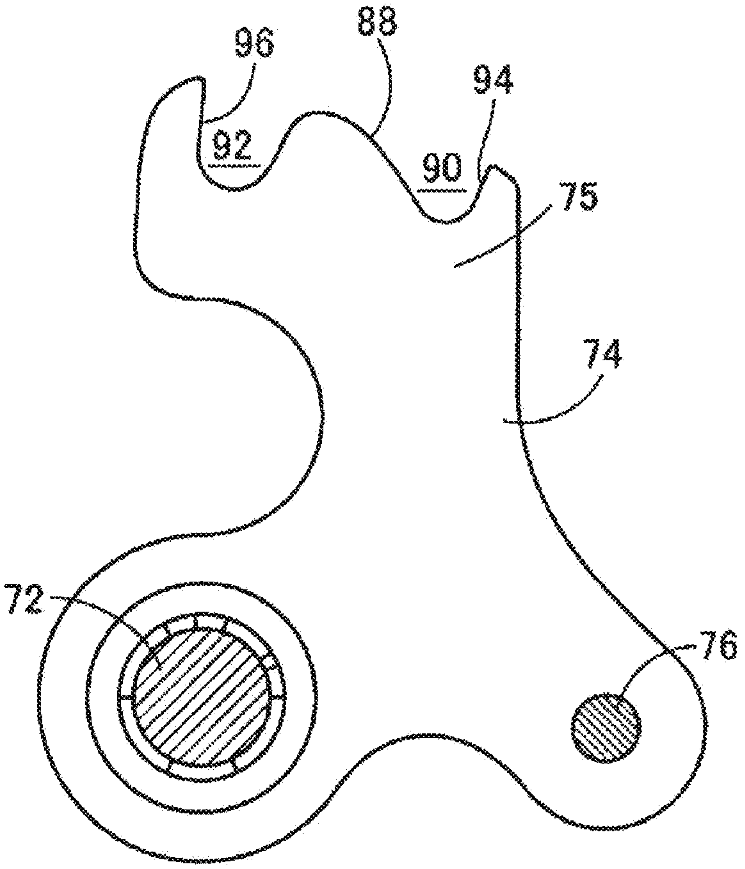
FIG. 3 is a schematic configuration diagram of the detent plate 74.

The parking lock device 60 is controlled by HVECU 38 to lock and unlock the output member (drive wheel DW) of the transmission 28 (activate and unlock the parking lock). FIG. 2 is a schematic configuration diagram of the parking lock device 60. FIG. 3 is a schematic configuration diagram of a detent plate 74 included in the parking lock device 60. As illustrated in FIG. 2, the parking lock device 60 includes a parking lock mechanism 71, a motor 68, a speed reducer 69, and an encoder 70.

The motor 68 is configured as, for example, a switched reluctance motor, and is connected to the shaft 72 of the parking lock mechanism 71 via the speed reducer 69. The motor 68 is controlled by HVECU 38 to drive the parking locking mechanism 71. The speed reducer 69 is configured as, for example, a cycloidal speed reducer. The encoder 70 is configured as, for example, a rotary encoder. The encoder 70 rotates integrally with the motor 68, and outputs a pulse signal for acquiring a count value (encoder count) corresponding to the rotational speed of the motor 68 to HVECU 38. HVECU 38 acquires the encoder count based on the pulse signal from the encoder 70, detects the rotation amount of the motor 68, and controls the motor 68 based on the rotation amount.

The parking lock mechanism 71 includes a shaft 72 that is rotationally driven by the motor 68, a detent plate 74 that rotates with the rotation of the shaft 72, a rod 76 that operates with the rotation of the detent plate 74, a tapered member 86 that is provided at a distal end portion of the rod 76, a parking gear 78 that rotates integrally with an output member of the transmission 28 (rotates in conjunction with a drive wheel DW), a parking lock pawl 80 that blocks (locks) the rotation of the parking gear 78, and a detent spring 82 that restricts the rotation of the detent plate 74 and fixes a shift position (shift position of the transmission 28) using a roller 84 that rotatably supports the parking lock pawl.

As shown in FIG. 3, two valleys are provided at the free end 75 of the detent plate 74 spaced from the shaft 72 and the rod 76. The two valleys are provided in the order of a non-parking lock position (hereinafter, referred to as "non-P position") 90 for releasing the operation of the parking lock and a parking lock position (hereinafter, referred to as "P position") 92 for operating the parking lock in the counterclockwise direction of FIG. 3 with respect to the shaft 72. Further, the free end 75 of the detent plate 74, the peak 88 is provided between the non-P position 90 and the P position 92, the non-P wall 94 is provided on the opposite side of the peak 88 with respect to the non-P position 90, P wall 96 is provided on the opposite side of the peak 88 with respect to the P position 92. The non-P wall 94 and the P wall 96 are provided to define the range of rotation of the detent plate 84 by defining the range of movement of the rollers 84.

As shown in FIG. 2, when the roller 84 is in the non-P position 90, since the parking gear 78 is not locked by the parking lock pawl 80, the output member (drive wheel DW) of the transmission 28 is not locked, that is, the parking lock is released. From this state, when the shaft 72 is rotated in the direction of the arrow C in FIG. 2 (clockwise direction in FIG. 2) by the motor 68, the rod 76 and the tapered member 86 are moved in the direction of the arrow A in FIG. 2 (upward direction in FIG. 2) via the detent plate 74, the free end portion of the parking lock pawl 80 is pushed in the direction of the arrow B in FIG. 2 (upward direction in FIG. 2) by the tapered member 86. Further, as the detent plate 74 rotates, the roller 84 moves from the non-P position 90 to the P position 92 side over the peak 88. As the detent plate 74 rotates until the roller 84 reaches the P position 92, the parking lock pawl 80 is pushed to a position where it meshes with the parking gear 78. As a result, the output member (drive wheel DW) of the transmission 28 is locked, that is, the parking lock is activated.

On the other hand, when the shaft 72 is rotated in the direction of the arrow D in FIG. 2 (the direction opposite to the arrow C) by the motor 68 from the state in which the parking lock is activated, the rod 76 and the tapered member 86 move in the direction opposite to the arrow A in FIG. 2 via the detent plate 74, and accordingly, the free end portion of the parking lock pawl 80 moves in the direction opposite to the arrow B in FIG. 2. Further, as the detent plate 74 rotates, the roller 84 moves from the P position 92 over the peak 88 to the non-P position 90, and the engagement between the parking lock pawl 80 and the parking gear 78 is released. As a result, the output member (drive wheel DW) of the transmission 28 is unlocked, that is, the parking lock is released.

Therefore, in the parking lock device 60, the shaft 72 and the detent plate 74 are rotated by the driving of the motor 68 based on the operation of the shift lever 41 (the shift lever position SL from the shift position sensor 42) of the driver, and the position of the roller 84 is switched between the non-P position 90 and the P position 92, and the unlocking and the unlocking of the output member (the drive wheel DW) of the transmission 28 is switched, that is, the operation of the parking lock and the release thereof are switched. The rotation amount of the motor 68 is regulated by the non-P wall 94 and the P wall 96. When the rotational amount (rotational angle) of the motor 68 is within the first predetermined range from the non-P-wall 94, HVECU 38 sets the recognized shift, which is the shift position recognized by HVECU 38, as the non-parking position. When the motor 68 rotates within the second predetermined range from the P-wall 96, HVECU 38 sets the recognized shift to the parking position. Further, HVECU 38 makes the recognized shift unknown because the recognized shift is undefined or being switched when the rotational amount of the motor 68 is between the first predetermined range and the second predetermined range.

The air conditioner 32 has a refrigeration cycle and performs air conditioning in the vehicle cabin. The battery 34 is configured as, for example, a lithium-ion secondary battery or a nickel-hydrogen secondary battery. The air conditioner 32 and the battery 34 are connected to the power line 54 together with the inverters 25 and 26, as described above. The system main relay 36 is provided between the inverters 25 and 26 of the power line 54 and the air conditioner 32 and the battery 34. The system main relay 36 is turned on and off by HVECU 38 to connect and disconnect the inverters 25 and 26, the air conditioner 32, and the battery 34.

HVECU 38 includes a microcomputer having a CPU, ROM, RAM, a flash memory, an input/output port, and a communication port. HVECU 38 receives signals from various sensors via input ports. For example, HVECU 38 receives the crank angle θcr from the crank position sensor that detects the rotational position of the crankshaft 23 of the engine 22. HVECU 38 also receives rotational positions θm1 and θm2 from a rotational position sensor that detects the rotational position of the rotor of the motor MG 1, MG 2. HVECU 38 also receives voltage Vb, current Ib, and temperature Tb from a voltage sensor, a current sensor, and a temperature sensor attached to the battery 34. HVECU 38 also receives a pulse signal from the encoder 70 of the parking lock device 60. HVECU 38 also receives the shift lever position SL from the shift position sensor 42 for detecting the operating position of the shift lever 41, the accelerator operation amount Acc from the accelerator pedal position sensor 44 for detecting the depressing amount of the accelerator pedal 43, the brake pedal position BP from the brake pedal position sensor 46 for detecting the depressing amount of the brake pedal 45, and the vehicle speed V from the vehicle speed sensor 47. The operation position of the shift lever 41 includes a parking position (P position), a reverse position (R position), a neutral position (N position), and a forward position (D position).

HVECU 38 outputs various control signals via an output port. For example, HVECU 38 outputs control signals to the engine 22, the inverters 25 and 26, the transmission 28, the parking lock device 60 (motor 68), the air conditioner 32, and the system main relay 36. HVECU 38 performs various operations. For example, HVECU 38 calculates the rotational speed Ne of the engine 22 based on the crank angle θcr of the engine 22 from the crank position sensor. HVECU 38 also calculates the rotational speed Nm1, Nm2 of the motor MG 1, MG 2 based on the rotational positions θm1 and θm2 of the rotor of the motor MG 1, MG 2 from the rotational position sensor. HVECU 38 also calculates the power storage ratio SOC of the battery 34 based on the integrated value of the current Ib of the battery 34 from the current sensor. HVECU 38 acquires the encoder count based on the pulse signal from the encoder 70 and detects the rotational speed of the motor 68. HVECU 38 is deactivated in a system-deactivated state of the vehicle.

The power supply ECU 50 comprises a microcomputer as well as a HVECU 38. The power supply ECU 50 receives, for example, an ignition signal IG from the ignition switch 52. The power supply ECU 50 performs wired communication with HVECU 38 and wirelessly communicates with the outside of the vehicle, for example, the user equipment 120 via DCM. The power supply ECU 50 is in an activated state regardless of a system activated state and a system deactivated state of the vehicle. When the ignition switch 52 is turned on or a later-described remote air conditioning request is received from the user equipment 120 in a system-stopped state of the vehicle, the power supply ECU 50 turns on the ignition-signal IG and turns on HVECU 38 from the non-operating state to the operating state.

The user equipment 120 is configured as, for example, a smartphone or a tablet terminal having a function of a microcomputer and a communication function. In the user equipment 120, a remote air conditioning application 130 as application software for causing the air conditioner 32 to perform air conditioning in a vehicle cabin of a hybrid electric vehicle 20 by remote control is installed. The user equipment 120 communicates with hybrid electric vehicle 20 via a communication network such as the Internet or a telephone line by the process of the remote air conditioning application 130.

In the remote air conditioning system 10 configured as described above, when the remote air conditioning application 130 of the user equipment 120 is operated by the user and an instruction to transmit the remote air conditioning request is given, the remote air conditioning request is transmitted to hybrid electric vehicle 20. When a remote air conditioning request is received from the user equipment 120 in a system-stopped state of the vehicle, the power supply ECU 50 of hybrid electric vehicle 20 turns on the ignition-signal IG and turns on HVECU 38 from the non-operating state to the operating state. When HVECU 38 is activated, it performs a process such as turning on the system main relay 36. The system startup includes the startup of HVECU 38 and the turning on of the system main relay 36. HVECU 38 then turns on the remote air conditioning request signal. When the remote air conditioning request signal is on, the remote air conditioning in which the air conditioner 32 is operated with the engine 22 in operation (with power generation by the motor MG1 using the power of the engine 22) is executed on the condition that the recognized shift, which is the shift position recognized by HVECU 38, is the parking position (on the condition that the parking lock device 60 knows that the drive wheel DW is locked). Here, in the remote air conditioning, the power generation by the motor MG 1 using the power of the engine 22 is performed in order to reduce an excessive decrease in the power storage ratio SOC of the battery 34 due to the operation of the air conditioner 32. Since the power of the engine 22 and the motor MG 1 is transmitted to the drive wheel DW by the operation of the engine 22 and the power generation of the motor MG 1, in the embodiment, the remote air conditioning is executed on the condition that the recognized shift is the parking position.

Since the encoder 70 is a relative-position sensor, HVECU 38 loses information such as the rotational amount of the motor 68, the position of the non-P-wall 94 (hereinafter, referred to as "non-P-wall position"), and the position of the P-wall 96 (hereinafter, referred to as "P-wall position") when the encoder is in a non-operating state. For this reason, HVECU 38 is unable to immediately place the recognized shift in the parking position when it is in the operating state from the non-operating state. Therefore, the HVECU 38 executes wall contact control (predetermined control) described later using the encoder 70 in order to detect the P wall position of the motor 68 and set a reference position (a position where the rotational amount of the motor 68 is zero). Then, when the P wall position is detected by the wall contact control and the reference position is set, the parking lock device 60 is controlled based on the operation of the shift lever 41 (shift lever position SL from the shift position sensor 42) to activate or deactivate the parking lock. In addition, HVECU 38 sets the recognized shift as the non-parking position (in the embodiment, the neutral position) that is an initial value in parallel with the start of the wall contact control, and sets the recognized shift as the shift position (the detected shift position) based on the rotational amount of the motor 68 after the completion of the wall contact control.

Figure 4:
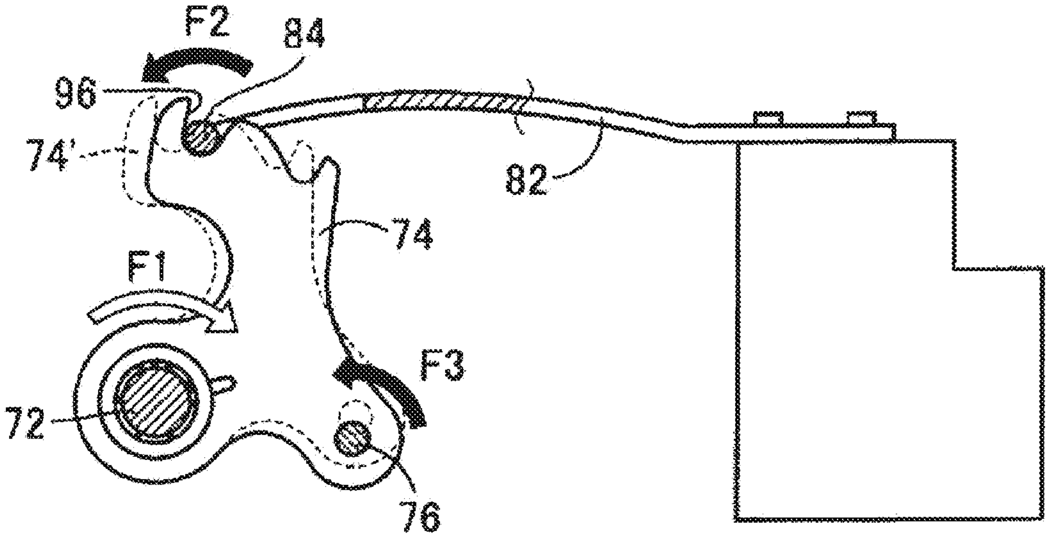
FIG. 4 is a diagram illustrating wall contact control.

Here, the wall contact control will be described. FIG. 4 is a diagram illustrating the wall contact control. In the wall contact control, first, the detent plate 74 is rotated in the direction indicated by the arrow C in FIG. 2, that is, in a direction in which the P wall 96 approaches the roller 84 by driving the motor 68 to bring the roller 84 and the P wall 96 into contact with each other. The P wall 96 functions as a restricting portion for restricting the rotation of the motor 68 in the direction indicated by the arrow C in FIG. 2. In FIG. 4, an arrow F1 indicates a rotational force of the motor 68, an arrow F2 indicates a spring force of the detent spring 82, and an arrow F3 indicates a pushing-back force of the rods 76. The detent plate 74' (see dotted line) indicates the position at which the P wall 96 is in contact with the roller 84. Therefore, the detection of the position of the detent plate 74' corresponds to the detection of the P-wall position. Even after the detent plate 74 contacts the P-wall 96 and the roller 84, the detent plate is rotated against the spring force of the detent spring 82 from the position indicated by the dotted line toward the arrow C in FIG. 3 by the rotational force F1 of the motor 68. As a result, the detent spring 82 is deflected, the spring force F2 is increased, the push-back force by the rods 76 is increased, and the rotation of the detent plate 74 is stopped when the rotational force F1, the spring force F2, and the push-back force F3 are balanced. HVECU 38 determines the rotational stoppage of the detent plate 74, such as when the encoder count based on the pulse signal from the encoder 70 is stopped for a predetermined time, sets the position of the detent plate 74 at that time as the temporary P-wall position, calculates the deflection amount or the deflection angle of the detent spring 82, and corrects the temporary P-wall position using the calculated deflection amount or deflection angle to set the P-wall position. Then, in the P wall position, the encoder count is set to CNTP, the motor 68 is rotated so as to set the encoder count to zero, and the detent plate 74 is rotated in the direction indicated by the arrow D in FIG. 3, that is, in a direction in which the P wall 96 is separated from the roller 84, and the position of the detent plate 74 is set as a reference position. The reference position is a predetermined position within the parking position range, and is set such that a difference between the encoder count and the P-wall position becomes a CNTP. When the P wall position and the reference position are set, the first predetermined range, the non-P wall position, the second predetermined range, and the like can be set based on the P wall position and the reference position. Therefore, the recognized shift can be a shift position (detected shift position) based on the rotation amount of the motor 68.

Figure 5:
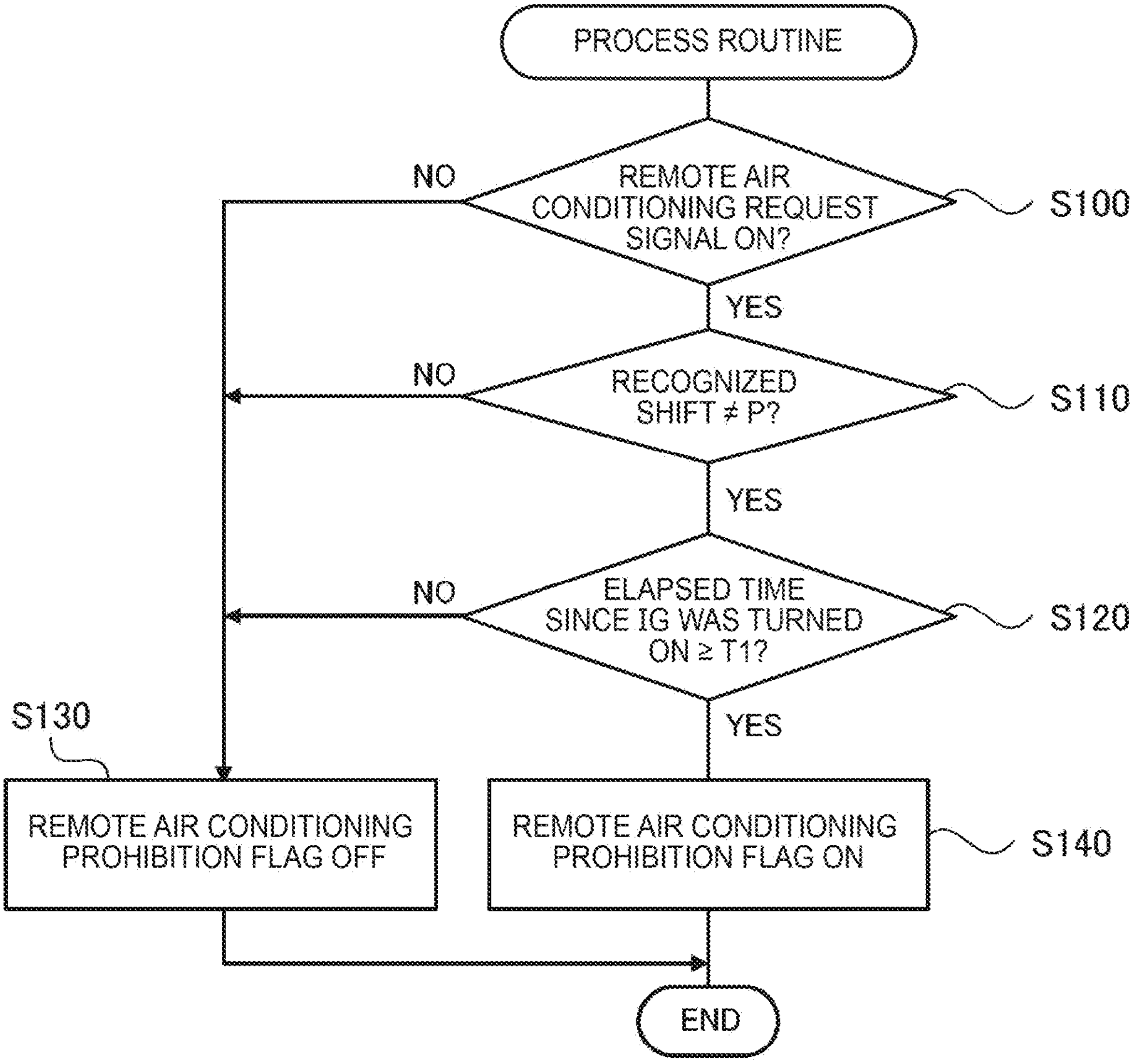
FIG. 5 is a flowchart illustrating an example of a process routine that is executed by HVECU 38.

Next, the operation of hybrid electric vehicle 20 of the embodiment, in particular, the operation when the power supply ECU 50 receives the remote air conditioning request in the system-stopped state of the vehicle, turns on the ignition-signal IG, and changes the HVECU 38 from the non-operating state to the operating state, and the HVECU 38 then turns on the remote air conditioning request signal will be described. FIG. 5 is a flowchart illustrating an example of a process routine that is executed by the HVECU 38. This routine is executed for the first time when the HVECU 38 changes from the non-operating state to the operating state, and is repeatedly executed when the prohibition of the remote air conditioning has not been determined (the remote air conditioning prohibition flag described later is not turned on).

When the process routine of FIG. 5 is executed, the HVECU 38 first determines whether the remote air conditioning request signal is on (S100). When it is determined that the remote air conditioning request signal is OFF, the remote air conditioning prohibition flag is set to OFF (S130), and the routine ends. Since the remote air conditioning request signal is off, the remote air conditioning is not executed regardless of the remote air conditioning prohibition flag. Note that the off of the remote air conditioning prohibition flag means not prohibiting the remote air conditioning or suspending the prohibition of the remote air conditioning, and the on of the remote air conditioning prohibition flag means determining the prohibition of the remote air conditioning.

When S100 determines that the remote air conditioning request signal is on, it determines whether the recognized shift is a parking position (S110). When it is determined that the recognized shift is the parking position, the remote air conditioning prohibition flag is set to S130 and the routine ends. In this case, since the remote air conditioning request signal is on and the recognized shift is the parking position, the remote air conditioning is executed.

When it is determined in S110 that the recognized shift is not the parking position (i.e., the non-parking position), it is determined whether or not the elapsed time since the ignition signal IG was turned on (elapsed time since starting of the system) is equal to or more than a predetermined time T1 (S120). Here, the predetermined time T1 is defined as a time longer than the time required for the above wall contact control. That is, while the elapsed time is less than the predetermined time T1, the recognized shift is changed from the non-parking position (in the embodiment, the neutral position) that is an initial value to the shift position (the detected shift position) based on the rotational amount of the motor 68.

When it is determined in S120 that the elapsed time is less than the predetermined time T1, the remote air conditioning prohibition flag is set to S130, and the routine ends. That is, even when the recognized shift is not the parking position, the prohibition of the remote air conditioning is suspended when the elapsed time is less than the predetermined time T1. After that, the routine is repeatedly executed, and if the recognized shift is changed to the parking position while the elapsed time is less than the predetermined time T1, the remote air conditioning is executed on the condition that the recognized shift is changed.

When it is determined in S120 that the elapsed time is equal to or longer than the predetermined time T1, the remote air conditioning prohibition flag is set to S140, and the routine ends. That is, the prohibition of the remote air conditioning is determined.

When the process of S120 is excluded from the process of FIG. 5, when the recognized shift is the non-parking position (in the embodiment, the neutral position) that is an initial value, S110 determines that the recognized shift is the non-parking position, and determines prohibition of the remote air conditioning. On the other hand, in the embodiment, even when the recognized shift is the non-parking position, prohibition of the remote air conditioning is suspended when the elapsed time since the ignition signal IG was turned on (elapsed time since starting of the system) is less than the predetermined time T1. Remote air conditioning is executed on the condition that the recognized shift is subsequently changed to the parking position while the elapsed time is less than the predetermined time T1. This makes it possible to improve the convenience of remote air conditioning.

Figure 6:
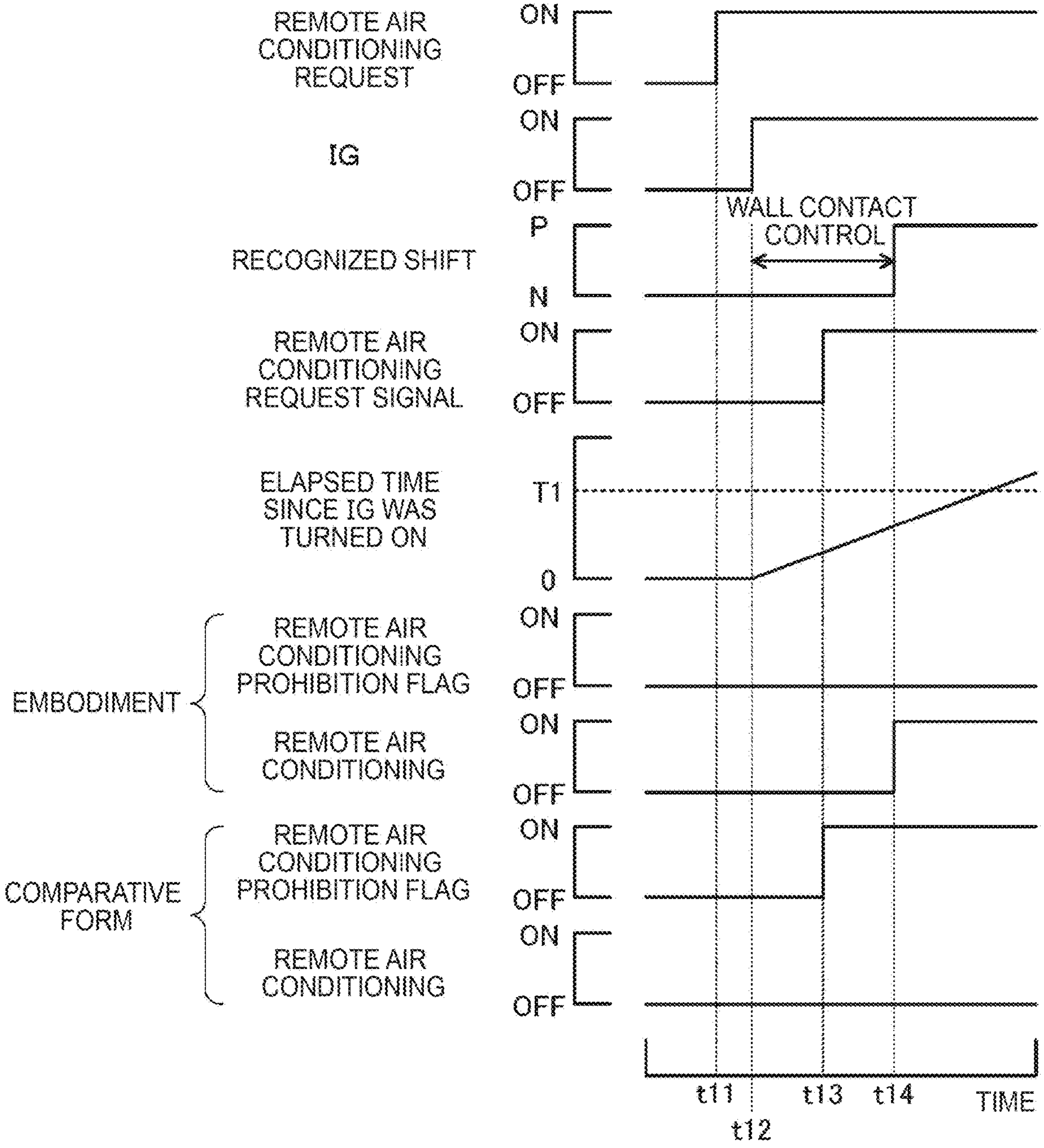
FIG. 6 is an explanatory diagram illustrating a state in which hybrid electric vehicle 20 receives a remote air conditioning request from user equipment 120 in a system-stopped state.

FIG. 6 is an explanatory diagram illustrating a state in which hybrid electric vehicle 20 receives a remote air conditioning request from the user equipment 120 while the vehicle is in the system-stopped state. In the figure, the remote air conditioning prohibition flag and whether the remote air conditioning is executed are illustrated in the case of the embodiment and the case of the comparative form. In the comparative form, the process routine of FIG. 5 excluding S120 is executed. In other words, when it is determined in S110 that the recognized shift is not the parking position, the remote air conditioning prohibition flag is turned on (S140), and this routine is terminated.

In the embodiment and the comparative form, when the power supply ECU50 of hybrid electric vehicle 20 receives the remote air conditioning request from the user equipment 120 in the system stopped state (time t11), the ignition-signal IG is turned on (time t12), HVECU 38 is turned from the inactive state to the activated state, and HVECU 38 performs processes such as turning on the system main relay 36. When HVECU 38 is activated, the wall contact control is started and the recognized shift is set to a non-parking position that is an initial value, specifically, a neutral position. In the comparative form, when the remote air conditioning request signal is subsequently turned on (time t13), the remote air conditioning prohibition flag is turned on because the recognized shift is in the non-parking position, that is, the prohibition of the remote air conditioning is determined. As a result, the remote air conditioning is not executed. On the other hand, in the embodiment, the elapsed time since the ignition signal IG was turned on (elapsed time since starting of the system) is measured. Then, when the remote air conditioning request signal is turned on (time t13), even if the recognized shift is the non-parking position, when the elapsed time is less than the predetermined time T1, the remote air conditioning prohibition flag is held off, that is, the prohibition of the remote air conditioning is suspended. The remote air conditioning is executed on the condition that the recognized shift is changed to the parking position while the elapsed time is less than the predetermined time T1 (time t14). This makes it possible to improve the convenience of remote air conditioning.

In hybrid electric vehicle 20 of the present embodiment described above, when the remote air conditioning request is received from the user equipment 120 in the system-stopped condition of the vehicle, the remote air conditioning request signal is turned on after the system is started, and the remote air conditioning is executed on condition that the recognized shift is the parking position. In this case, when the recognized shift is not the parking position, prohibition of the remote air conditioning is suspended when the elapsed time since the ignition signal IG was turned on (elapsed time since starting of the system) is less than the predetermined time T1. Prohibition of the remote air conditioning is determined when the elapsed time is equal to or more than the predetermined time T1. The remote air conditioning can thus be executed on the condition that the recognized shift is changed from the non-parking position (neutral position) that is an initial value to the parking position while the elapsed time is less than the predetermined time T1. As a result, the convenience of remote air conditioning can be improved.

In the above-described embodiment, two valleys, specifically, the non-P position 90 and the P position 92 are provided at the free end 75 of the detent plate 74 of the parking lock device 60, but the present disclosure is not limited thereto. For example, the free end 75 may be provided with four valleys corresponding to each position of the shift lever 41, for example, a parking position, a reverse position neutral position, and a forward position.

In the above-described embodiment, the battery 34 is used as the energy storage device, but a capacitor or the like may be used instead.

In the above-described embodiment, hybrid electric vehicle 20 includes the transmission 28, but may not include it.

In the above-described embodiment, the engine 22, the motor MG 1, and the intermediate shaft IS are connected to the planetary gear 24, the motor MG 2 is connected to the intermediate shaft IS, and the drive wheel DW is connected to the intermediate shaft IS via the transmission 28 and the drive shaft DS, and the inverters 25 and 26 for driving the motor MG 1, MG 2, the air conditioner 32, and the battery 34 are connected to the same power line. However, the configuration is not limited to this hybrid electric vehicle 20. For example, a so-called one-motor hybrid electric vehicle configuration may be adopted in which an intermediate shaft is connected to the engine via a clutch, a motor is connected to the intermediate shaft, and drive wheels are connected to the intermediate shaft via a transmission and a drive shaft, and an inverter for driving the motor, an air conditioner, and a battery are connected to a common power line. Further, a general engine vehicle configuration may be adopted in which drive wheels are connected to an engine via a transmission device and a generator (alternator) is connected to the engine, and the generator, the air conditioner, and the auxiliary battery are connected to a common power line.

The correspondence between the main elements of the embodiments and the main elements of the disclosure described in the column of the means for solving the problem will be described. In the embodiment, the engine 22 corresponds to the “engine”, the motor MG 1 corresponds to the “generator”, the air conditioner 32 corresponds to the “air conditioner”, the battery 34 corresponds to the “energy storage device”, and HVECU 38 corresponds to the “control device”.

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a vehicle and the like.

What is claimed is:

1. A vehicle, comprising:

an engine;

a generator configured to generate electricity using power from the engine;

an air conditioner configured to perform air conditioning in a vehicle cabin;

a battery connected, together with the generator and the air conditioner, to a power line; and a microcomputer configured to, in response to receipt of a remote air conditioning request from user equipment while the vehicle is in a non-operating state, be activated and perform following processes:

(i) setting an initial value of a non-parking position as an initial recognized shift position upon the activation of the microcomputer;

(ii) starting a predetermined control to determine a detected shift position after setting the initial recognized shift position to the initial value; and (iii) transmitting a remote air conditioning request signal, wherein the microcomputer is further configured to repeatedly execute a process routine including:

(a) determining whether the remote air conditioning request signal is turned on;

(b) in a case where the remote air conditioning request signal is transmitted, determining whether the initial recognized shift position is a parking position;

(c) in a case where the initial recognized shift position is not the parking position:

setting a remote air conditioning prohibition flag to OFF to suspend prohibition of the remote air conditioning in a case where an elapsed time from a timing at which an ignition signal IG is transmitted is less than a predetermined time, without executing the remote air conditioning; and setting the remote air conditioning prohibition flag to ON to prohibit the remote air conditioning in a case where the elapsed time is equal to or more than the predetermined time;

wherein the microcomputer is further configured to set the initial recognized shift position to a detected shift position upon completion of the predetermined control, and to execute the remote air conditioning in a case where the remote air conditioning request signal is transmitted, the remote air conditioning prohibition flag is OFF, and the initial recognized shift position is the parking position, the remote air conditioning being an activation of the air conditioner while the engine is operating.

2. The vehicle according to claim 1, wherein the predetermined time is set longer than a time required for the predetermined control.

3. The vehicle according to claim 1, wherein the predetermined control is a parking lock control and comprises:

rotating a detent plate by driving a motor of a parking lock device until the detent plate is restricted by a restricting portion;

detecting the position of the detent plate at which the detent plate is restricted, based on the signal from an encoder provided on the motor; and setting a reference position for determining the recognized shift based on the detected position.

4. The vehicle according to claim 1, wherein the vehicle is a shift-by-wire vehicle in which the shift positions are electrically switched.

* * * * *